July 5, 1932.   G. W. CORNELIUS   1,865,744
AIRPLANE
Filed Sept. 17, 1928   2 Sheets-Sheet 2
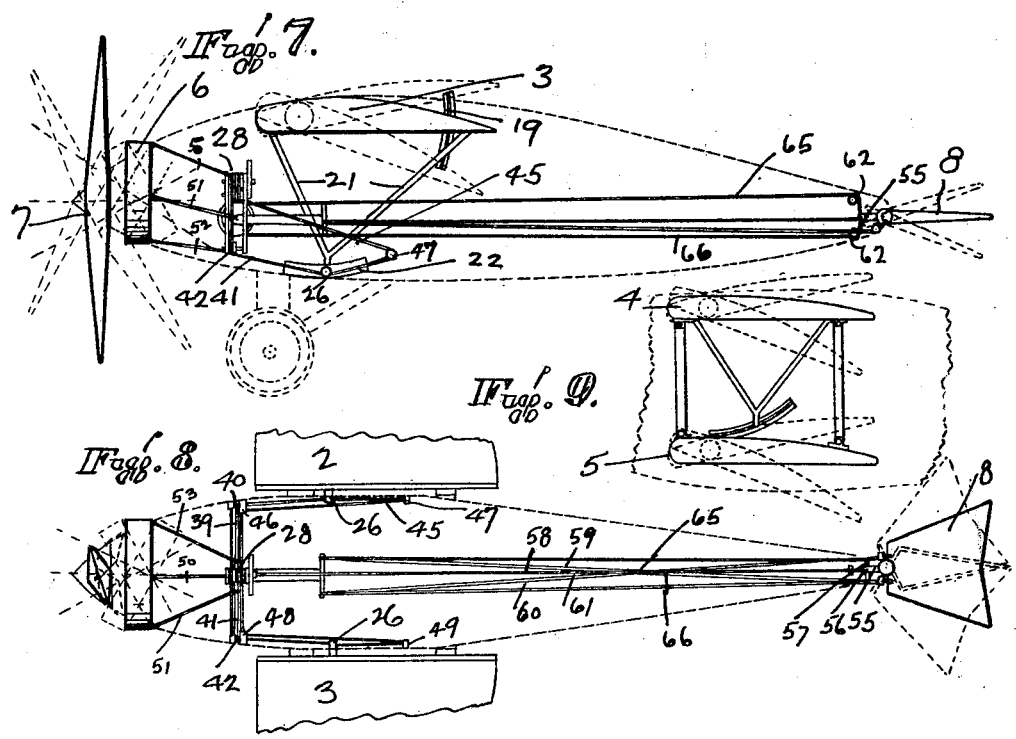
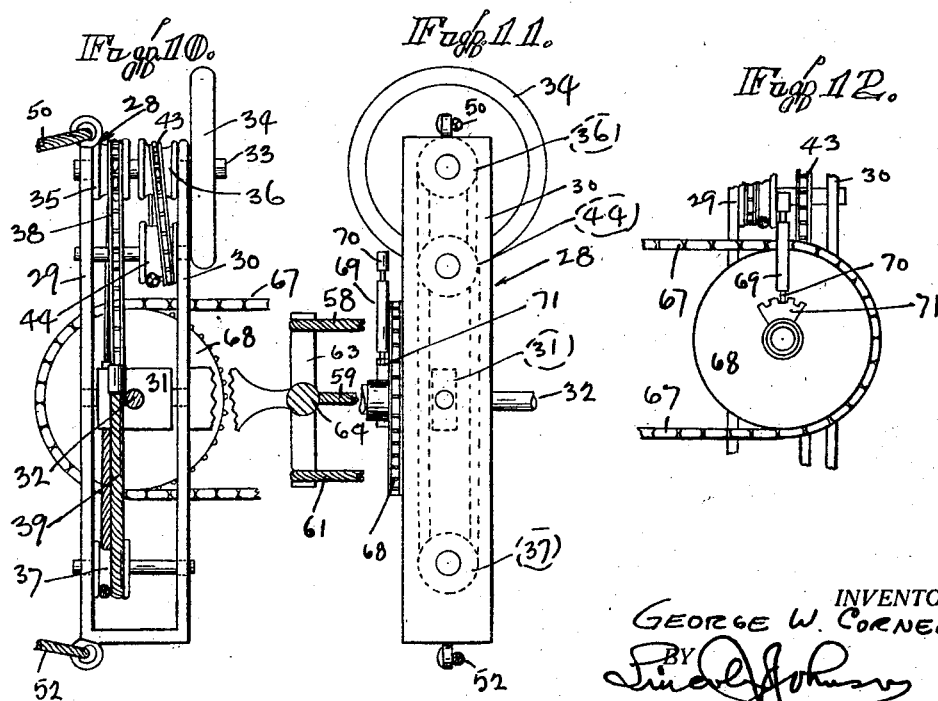
INVENTOR.
GEORGE W. CORNELIUS
BY
ATTORNEYS.

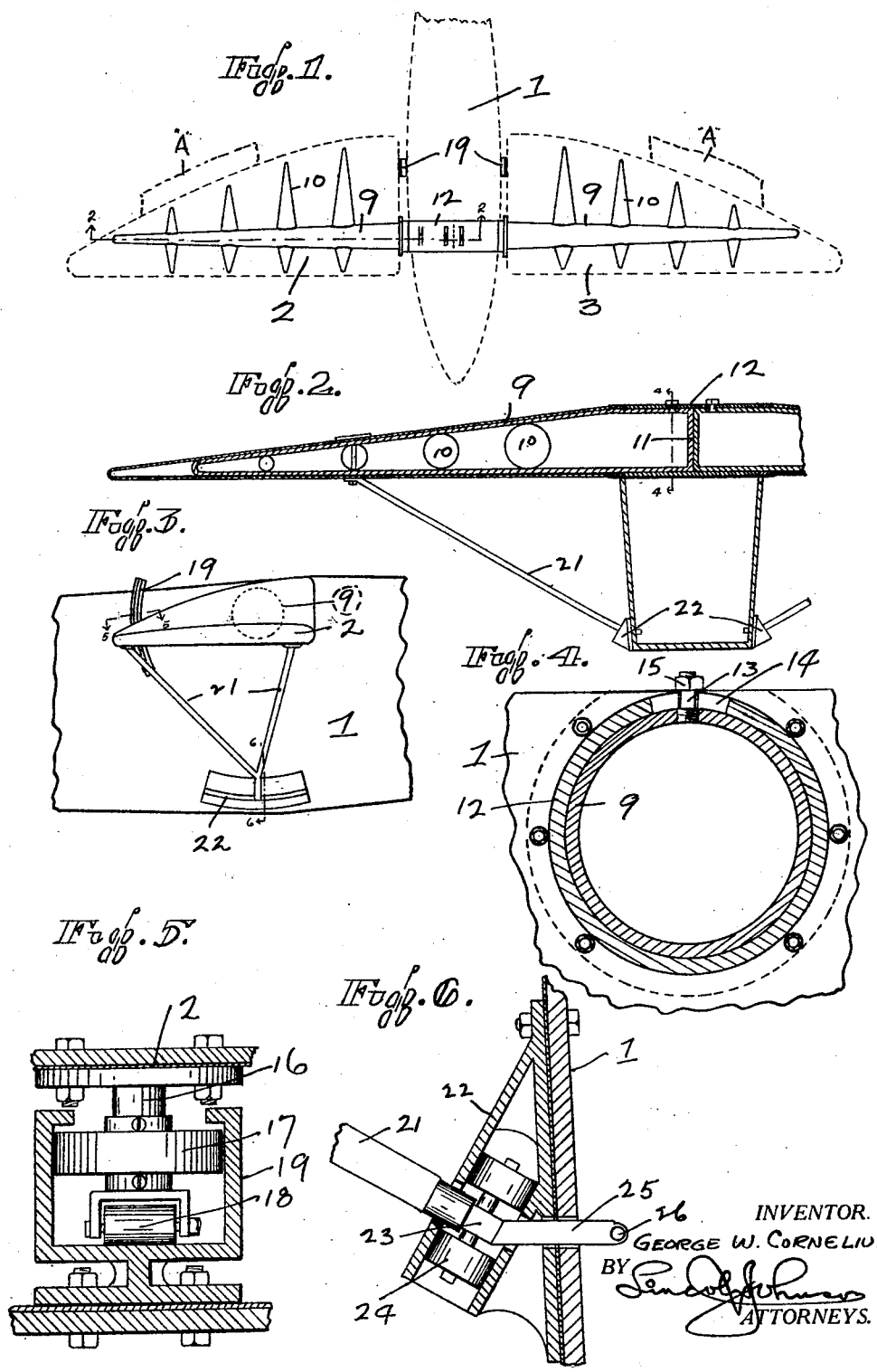

Patented July 5, 1932

1,865,744

UNITED STATES PATENT OFFICE

GEORGE W. CORNELIUS, OF SAN LEANDRO, CALIFORNIA, ASSIGNOR TO CORNELIUS AIRCRAFT CORPORATION, LIMITED, OF LOS ANGELES, CALIFORNIA, A CORPORATION OF CALIFORNIA

AIRPLANE

Application filed September 17, 1928. Serial No. 306,515.

This invention relates particularly to airplanes.

An object of the invention is to provide an airplane assembly including fuselage, wings, tail, and propeller, arranged so that the propeller, wings and tail, individually or collectively, may be moved out of a normal position relative to the fuselage to control directional movement of the airplane.

A further object of the invention is to provide an airplane fuselage having wings projected from opposite sides of said fuselage, each wing on each side of the fuselage being independent of the other and being rotatably secured to the said fuselage to be moved above or below a predetermined normal position.

A still further object of the invention is to provide an airplane fuselage having wings on opposite sides thereof, in a substantially horizontal position, adapted to be rotated above or below a horizontal plane, said wings being connected to a mounting supporting the propulsion medium, and to a mounting supporting the tail, whereby the said propulsion medium, wings and tail may be moved in synchronism, or separately, to steer the airplane into any selected line of flight.

Other objects of the invention are to provide a device of the character described that will be superior in point of simplicity, inexpensiveness of construction, positiveness of operation, and facility and convenience in use and general efficiency.

Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings

Fig. 1 represents a plan view of an airplane having a wing and fuselage construction in accordance with my invention.

Fig. 2 is an enlarged cross section taken through Fig. 1 on the line 2—2.

Fig. 3 is an end view of a fragmentary portion of the fuselage and one of the wings to show the wing supporting structure.

Fig. 4 is an enlarged cross section taken through the joint where the wing is secured to the fuselage, on the line 4—4 of Fig. 2.

Fig. 5 is an enlarged cross section taken on the line 5—5 of Fig. 3, showing a method of movably confining the movable edge of the airplane wing to the fuselage.

Fig. 6 is an enlarged section taken through Fig. 3 on the line 6—6 to show a method of movably securing the wing structure to the fuselage.

Fig. 7 is a diagrammatic side elevation of an airplane having a wing structure mounted thereon constructed in accordance with my invention, connected to the mechanism for manipulating said wing and also showing the controlling mechanism connected to a propeller mounting and tail mounting to be moved in synchronism with the wings or independently thereof.

Fig. 8 is a plan view of Fig. 7.

Fig. 9 is a side elevation of a fragmentary portion of an airplane of the biplane type in which both of the planes are connected to the fuselage by the same form of connection as that employed in securing the single plane shown in Fig. 7 to the fuselage.

Fig. 10 is a side elevation of the controlling mechanism for the wing, engine mounting and tail.

Fig. 11 is a rear view of Fig. 10.

Fig. 12 is a side elevation of a portion of Fig. 11 taken on the line 12—12 of Fig. 11.

In detail, the construction illustrated in the drawings comprises an airplane fuselage generally designated by the numeral 1. As in conventional airplane construction the fuselage is provided with wings 2 and 3 on opposite sides of the forward end of the fuselage, forming a monoplane, and shown in Fig. 9 with a pair of wings 4 and 5 on each of the opposite sides of the fuselage to form a biplane. The forward end of the fuselage 1 has a motor 6 universally mounted therein, to which a propeller 7 is secured. The rear end of the fuselage has a tail 8 flexibly mounted thereon.

In a conventional type of airplane, either of the monoplane or biplane type, the wings are fixedly secured to opposite sides of the fuselage, and an aileron 'A' is mounted on the trailing edge of each wing adjacent the outer end thereof, to control the balance of the airplane while in flight, and to maintain a relatively stable equilibrium of the said airplane, during flight. Likewise, airplane engines are ordinarily mounted in fixed position within the forward end of the fuselage, and the rear end of the said fuselage is provided with a rudder and a tail controlled by the operator for steering the airplane either to the right or left and upwardly or downwardly. From my experiments, I have discovered that the wings 2 and 3 of an airplane may be pivotally mounted on opposite sides of the fuselage 1 so as to have a limited movement above or below a horizontal level to effect a stable equilibrium of the airplane while in the air, with the same effect that the balance of the airplane is accomplished through the medium of the ailerons. Obviously, the movement of the wings above or below a predetermined horizontal flying position will either hasten the ascent or descent of the airplane, or hasten the turning of the plane either to the right or to the left, thus to increase the efficiency of the plane in moving in any direction in the air beyond what the directional movement of the airplane would be when controlled by the conventional aileron and tail and rudder system.

The wings 2 and 3 are each provided with a tapered tubular support 9 therein, each support in turn having laterally disposed tubular supporting webs 10 extended therefrom along its entire length, to form a foundation for the wing covering, to be mounted around and to enclose the entire tubular assembly. Each of the main supports 9 are closed at 11 at the meeting ends, so that the interiors of said supports may be used as fluid supply tanks. The ends 11 of the wing supports 9 meet centrally within the fuselage, and are journalled in a tubular bearing 12, secured adjacent the upper part of the fuselage. Each support 9 is provided with a bolt 13 thereon that projects through a slot 14 in the bearing, and a nut 15 is secured to each bolt to hold the wing supports 9 from becoming axially displaced. The slot in the bearing 12 permits the supports 9 to have a limited rotative movement.

In view of the fact that the construction of each of the wings is identical, the following description will be confined to one wing only, and it is to be understood that a similar construction and operation applies to the other wing structure assembly. I do not intend to rely wholly upon the wing supports 9, mounted in the fuselage bearing, to carry the entire stress of the wing while in flight, as I have discovered that it is better to reinforce the wing structure by means apart from the main bearing.

Adjacent the trailing edge of each wing, next to where same abuts the fuselage 1, I have provided a bracket 16 having a roller 17 rotatively mounted thereon and with an end thrust roller 18 journaled across the end of said bracket. Both of the rollers 17 and 18 are movably confined within an arcuate and channel shaped guideway 19 that is secured to the outside of the fuselage 1. The length of the arcuate guide is determined, to regulate the length of swinging movement which it is desired that the wings shall have. The channel shaped guideway 19 holds the wing rollers 17 and 18 therein, allowing said rollers to move freely in the guideway, as the wing is turned relative to the fuselage. The rollers in the guide way 19 prevent the edge of the wing 2 from getting out of abutting contact with the fuselage 1.

Each of the wings 2 and 3 are also provided with struts 21 secured to a mediate portion of the wing, and said struts extend downwardly through an arcuate guide 22 provided along the bottom of the fuselage. The end 23 of each strut 21 within the arcuate slot 22 is provided with rollers 24 rotatably mounted thereon, to permit the lower end of said strut to move relatively free from one end of the guideway to the other. An end 25 of the strut 21 extends through the fuselage into the interior thereof, and is provided with an eyelet 26 thereon to which a control wire 27 may be fastened that connects to the operator's control stick 28, for tilting the wing above or below its normal horizontal plane, according to the desires of the airplane operator.

The control stick 28 for moving the wings upwardly or downwardly, consists of a pair of spaced members 29 and 30 having a bearing block 31 rotatably mounted therebetween. The bearing block is rotatably mounted on a fixed shaft 32 that extends transversely across and is secured to the airplane fuselage. The fixed shaft 32 permits the control stick 28 to be moved fore and aft or rotated therearound within a limited degree, and at the same time the control stick may be rotated sidewise in either direction. A shaft 33 is journaled across the upper end of the control stick 28, and has a steering wheel 34 mounted on an end thereof. The shaft 34 is also equipped with a pair of toothed sprockets 35 and 36 thereon, confined between the opposite sides 29 and 30 of the control stick. An idler pulley 37 is rotatively mounted adjacent the lower end of the control stick. A chain 38 passes around the sprocket 35 on the upper end of the control stick, and one end of said chain is fastened to a wire 39 that passes around the lower pulley 37 in the control stick, and then passes around a pulley 40 on the side of the fuselage 1 and thence is connected to the end 26 of the strut support of the wing 2 that extends within the fuselage. The opposite end of the chain has a wire 41 connected thereto that extends around the lower pulley 37 in the control stick and continues to the opposite side of the fuselage, passing around a pulley thereon, 42, and thence to connection with the lower end 26 of the strut 21 of the wing 3 that extends within the fuselage.

A chain 43 extends around the other sprocket 36 on the steering wheel shaft, and thence around a pulley 44 that is journaled on the control stick 28 directly beneath the sprockets on the upper end of said stick. One end of the chain 43 has a wire 45 secured thereto that passes around a pulley 46 on one side of the fuselage 1 and thence around a pulley 47 positioned to the rear of the arcuate guideway 22 and thence to connection with the strut end 26 of the wing 2. The other end of the chain 43 extends around the pulley 44 and pulley 48 and thence around a pulley 49 on the side of the fuselage to the rear of the arcuate guide member 22, and thence to connection with the strut end 26 of the wing 3. Rotative movement of the steering wheel 34 will cause the wing 2 on one side of the fuselage to be elevated while the wing 3 on the opposite side of the fuselage will be lowered. This selective movement of the wings in opposite directions will control the turning movement of the airplane in exactly the same manner as a conventional airplane may be turned through the medium of the ailerons. It should be noticed that the wire connections from the control stick 28 to the wings extend from opposite ends of the pivotal center of the control stick. Thus by swinging the control stick 28 about its pivotal axis 32, both of the wings 2 and 3 on the opposite sides of the fuselage 1 may be moved simultaneously in either an upward or downward direction. My method of mounting the airplane wings 2 and 3 on the fuselage, permits said wings to be simultaneously moved in opposite directions, and also permits both of the wings to be raised or lowered in unison. Although I have described particularly the method of operating the wings of an airplane of the monoplane type, exactly the same operation takes place with an airplane of the biplane type, as shown in Fig. 9. The wings 4 and 5 shown in Fig. 9 being raised or lowered through the same type of mechanism as that heretofore described.

In Fig. 7 of the drawings, I have shown an engine 6 that is universally mounted in the fore end of the fuselage 1. The engine 6 is provided with a propeller 7 thereon, and the universal mounting of the engine is such that the propeller and engine may be moved out of a normal position in axial alignment with the fuselage into any selected angular position of any desired line of flight. The universal mounting of the engine in the airplane fuselage is more particularly illustrated and described in a pending application that I have filed. The engine mounting 6 is provided with four wires, 50, 51, 52 and 53 thereon that lead to opposite ends and opposite sides of the pilot's control stick 28 so that the engine and propeller may be moved in any desired position.

The airplane tail 8 mounted at the rear end of the fuselage, is universally secured to the said fuselage 1 in a ball mounting, whereby said tail may be moved up or down and to the right or left, through control means connected to the operator's stick 28. This ball mounting for the tail is more particularly illustrated and described in a separate pending application. The tail 8 is provided with an arm 55 that extends into the interior of the fuselage of the airplane, and said arm has two bars 56 and 57 arranged at right angles to each other, secured at the end of said arm 55. Control wires 58, 59, 60 and 61 are suitably connected to the ends of the cross bars 56 and 57, and said wires are passed around pulleys 62 and are joined to the ends of cross bars 63 and 64 that extend out from the stick 28 at the point of its pivotal connection to the fuselage. Thus, as the operator turns the control stick 28 forward or backward or turns it to the right or left, the wires connecting the stick 28 to the tail 8 cause the tail 8 to be moved either to the right or left and up or down. The tail of any airplane is used to control the up and down movement of the said vehicle, and to balance the said airplane while in flight. In a case where the airplane would be out of balance, or the weight carried by the plane would be improperly stowed, and the said airplane would be in a more or less unstable condition, this condition would be rectified by forcing the tail out of the normal operating position, to compensate for the unstableness of the plane. In the event that the tail 8 would have to continuously be maintained above or below its normal horizontal position, it would require the aviator pilot to hold the control stick 28 either forward or backward of its normal vertical position, to maintain the tail in the proper balanced operating position. Obviously, this would have the effect of placing the wings 2 and 3 or the propeller mounting 6 slightly out of the normal position. Therefore, in order to maintain the propeller mounting and the wings in a normal position of flight, and to allow the tail 8 to remain out of normal position, I provide a pair of wires 65 and 66 that are connected to the top and bottom of the arm 55 that extends into the fuselage from the tail 8. These wires 65 and 66, at their forward end are provided with a sprocket chain 67 that passes around a sprocket 68 journaled on the control stick supporting shaft 31. The sprocket 68 is provided with a casing 69 thereon in which a latch member 70 is reciprocatingly mounted. The latch member 70 registers with the toothed rack 71 that is fixedly mounted on the stick 28. Thus, where the control stick 28 is out of its normal vertical position to hold the tail up or down to keep the airplane in proper flying position, the latch 70 permits the sprocket wheel 68 to be turned to maintain the tail 8 in its out-of-the-normal position but to allow the control stick 28 to be moved into its true vertical position. The disalignment of the tail control 8 relative to the propeller 7 and wings 2 and 3 can be corrected by moving the sprocket wheel 68 relative to the control stick 28 after the cause of the unstable condition on the airplane has been removed.

Having thus described this invention, what I claim and desire to secure by Letters Patent is:

1. In an airplane, a main supporting surface rotatable to different acute angles relatively to the line of thrust thereon; propeller means universally mounted on the airplane in operative relation to the main supporting surface; a tail balancing surface mounted on the tail of the airplane with freedom of angular and rotary movement; and control means to turn said supporting surface to the desired angularity, said propeller means and said balancing surface being connected to said control means so as to allow the adjustment of the propeller and of the tail balancing surface either in unison with the supporting surface and with each other or independently thereof.

2. In an airplane a fuselage, wings mounted on the fuselage so as to be rotatable independently of each other to different angles of wing setting; means on the fuselage for guiding the trailing edges of the wings during the rotation thereof, and for preventing axial displacement of the trailing edges; guiding means below each wing connected to both the leading and the trailing edges of the wing to provide a third point guiding support therefor, and control means on the fuselage connected to the wings for adjusting the wing setting.

3. In an airplane a fuselage, wings thereon; means for mounting the wings on the fuselage with freedom of limited rotative movement to different wing settings; said means being adapted to prevent axial displacement of the wings; an arcuate guide channel on the fuselage adjacent to the trailing edge of each wing; antifriction thrust element on each trailing edge extending into the adjacent guide channel and being held therein so as to limit the arcuate movement of the trailing edge and to prevent axial displacement thereof; a second arcuate guide channel on each side of the fuselage adjacent to the bottom thereof the fuselage having arcuate slots therethrough at each of said second channels; struts extending from a mediate portion of each wing and projecting thru the adjacent second guide channels and slots; means on each strut coacting with the second guide channel for adjustably securing the struts to the fuselage; a control stick being swingably mounted on the fuselage and being connected to the free ends of said struts for moving the struts in the same direction thereby adjusting the setting of the wings in unison; and rotatable control mechanism on the control stick common to both wings being connected to the free ends of the struts for simultaneously rotating the wings in opposite directions to each other.

4. In an airplane, a fuselage, wings mounted thereon with freedom of limited rotative movement to different angles of wing settings; propeller means universally mounted on the fuselage in operative relation to the wings; control means swingably mounted on the fuselage and connected to the wings and to said propeller means for selectively adjusting the wing setting and the relative position of the propeller either individually or collectively.

5. In an airplane a fuselage, wings mounted thereon with freedom of limited angular adjustment relatively to the line of thrust thereon; propeller means universally mounted on the fuselage in operative relation to the wings; a tail balancing surface mounted on the tail of the fuselage with freedom of rotative and angular movements; a control stick connected to said wings, to said propeller means and to said tail balancing surface for selectively adjusting the wing settings, and the position of the propeller and the tail balancing surface relatively to the wings.

6. In an airplane a fuselage, wings mounted thereon with freedom of limited angular adjustment relatively to the line of thrust thereon; propeller means universally mounted on the fuselage; a tail balancing surface mounted on the tail of the fuselage with freedom of rotative and angular movements; a control stick mounted on the fuselage so as to be swingable fore and aft, and sidewise; means to connect said control stick to the wings for adjusting the wing setting by the sidewise swinging of the control stick; means to connect the propeller means to the control stick so as to adjust the propeller position by the swinging of the control stick; means to operatively connect the tail balancing surface to the control stick for allowing the adjustment thereof collectively with the adjustment of the wing setting; and means on the control stick connected to the tail balancing surface for maintaining the said surface in an adjusted position, independently of the other adjustments.

7. In an airplane a fuselage, wings mounted thereon with freedom of limited angular adjustment relatively to the line of thrust thereon; propeller means universally mounted on the fuselage; a tail balancing surface mounted on the tail of the fuselage with freedom of rotative and angular movements; a control stick mounted on the fuselage so as to be swingable fore and aft, and sidewise; means to connect said control stick to the wings for adjusting the wing setting by the sidewise swinging of the control stick; means to connect the propeller means to the control stick so as to adjust the propeller position by the swinging of the control stick; means to operatively connect the tail balancing surface to the control stick for allowing the adjustment thereof collectively with the adjustment of the wing setting; means on the control stick connected to the tail balancing surface for maintaining the said surface in an adjusted position, independently of the other adjustments; and a rotatable control mechanism on the control stick being connected to the wings for turning the wings in opposite direction to each other without affecting the adjustments of the propeller means and of the tail balancing surface.

8. In an airplane a fuselage, wings; tapered, tubular spar in each wing, tubular ribs extending from the spars for supporting the wing fabric, a bearing on the fuselage supporting the larger end of the spars so as to prevent axial movement thereof, and to allow a limited rotative movement of the wings; arcuate guides on the fuselage adjacent to the trailing edges of the wings, an antifriction projection extending from each trailing edge and being held in and guided by said arcuate guides for preventing axial displacement of the trailing edge; struts extending from a mediate portion of each wing, a second set of arcuate guides on the fuselage, said fuselage having arcuate slots therethru corresponding to said second guides; the free ends of said struts slidably extending thru the respective guides and slots; antifriction means on the struts for engagement with said second guides, and control means for moving the free ends of the struts in said slots so as to rotate the wings around the axis of the spars, said guide and control means being adapted to allow the self-adjustment of the wing setting in accordance with the balance of air pressure on the wings.

9. In an airplane a fuselage, wings; tapered, tubular spar in each wing, tubular ribs extending from the spars for supporting the wing fabric, a bearing on the fuselage supporting the larger end of the spars so as to prevent axial movement thereof, and to allow a limited rotative movement of the wings; arcuate guides on the fuselage adjacent to the trailing edges of the wings, antifriction projection extending from each trailing edge and being held in and guided by said arcuate guides for preventing axial displacement of the trailing edge; struts extending from a mediate portion of each wing, a second set of arcuate guides on the fuselage, said fuselage having arcuate slots therethru corresponding to said second guides; the free ends of said struts slidably extending thru the respective guides and slots; antifriction means on the struts for engagement with said second guides, and control means for moving the free ends of the struts in said slots so as to rotate the wings around the axis of the spars; propeller means universally mounted on the fuselage; and means for adjusting the direction of the propeller means for changing the position of the center of pressure on the wings.

In testimony whereof, I have hereunto set my hand at San Francisco, California, this 23d day of August, 1928.

GEORGE W. CORNELIUS.